(12) United States Patent
Hatazawa et al.

(10) Patent No.: US 6,418,785 B1
(45) Date of Patent: *Jul. 16, 2002

(54) MISFIRE DETECTING APPARATUS FOR INTERNAL COMBUSTION ENGINE

(75) Inventors: Yasuyoshi Hatazawa; Koichi Okamura; Mitsuru Koiwa; Yutaka Ohashi; Hisanori Nobe, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/531,326

(22) Filed: Mar. 20, 2000

(30) Foreign Application Priority Data

Sep. 27, 1999  (JP) ............................................. 11-273267

(51) Int. Cl.⁷ ............................................. G01M 15/00
(52) U.S. Cl. ...................................... 73/35.08; 73/117.3
(58) Field of Search ............................. 73/35.08, 35.07, 73/35.01, 116, 117.2, 117.3

(56) References Cited

U.S. PATENT DOCUMENTS

| | | | | |
|---|---|---|---|---|
| 5,483,818 A | * | 1/1996 | Brandt et al. ............... | 73/35.08 |
| 5,561,239 A | * | 10/1996 | Yasuda ....................... | 73/35.08 |
| 5,563,332 A | * | 10/1996 | Yasuda ....................... | 73/35.08 |
| 5,777,216 A | * | 7/1998 | Van Duyne et al. ......... | 73/35.08 |
| 5,925,819 A | * | 7/1999 | Yoshinaga et al. .......... | 73/35.08 |
| 6,091,244 A | * | 7/2000 | Rottler ........................ | 73/35.08 |
| 6,196,054 B1 | * | 3/2001 | Okamura et al. ........... | 73/35.08 |
| 6,205,774 B1 | * | 3/2001 | Hohner et al. .............. | 73/35.08 |

* cited by examiner

*Primary Examiner*—Eric S. McCall
(74) *Attorney, Agent, or Firm*—Sughrue Mion, PLLC

(57) ABSTRACT

A misfire detecting apparatus for an internal combustion engine detects only an ion current due to combustion of an air/fuel mixture regardless of a leakage current when combustion: takes place normally. The apparatus includes circuitry for detecting an ion current generated within the engine cylinder immediately after combustion, circuitry 21, 24, 26 for detecting a leakage current occurring between electrodes of a spark plug 14, a first waveform shaper 18 for shaping the ion current into a pulse signal indicating a combustion or misfire event by comparing the pulse signal with a first threshold value for deciding the ion current, the first threshold value being set on the basis of a level of the ion current upon rising thereof, the ion current being superposed on the leakage current, a second waveform shaper 20 for shaping the ion current as detected into a pulse signal through comparison with a second fixed threshold value which is fixed at a value smaller than the first threshold value, and a selector 22 for selectively outputting as the combustion pulse signal either a shaped pulse signal outputted from the first waveform shaper 18 upon detection of occurrence of the leakage current or a shaped pulse signal outputted from the second waveform shaper 20 when no leakage current is detected.

5 Claims, 12 Drawing Sheets

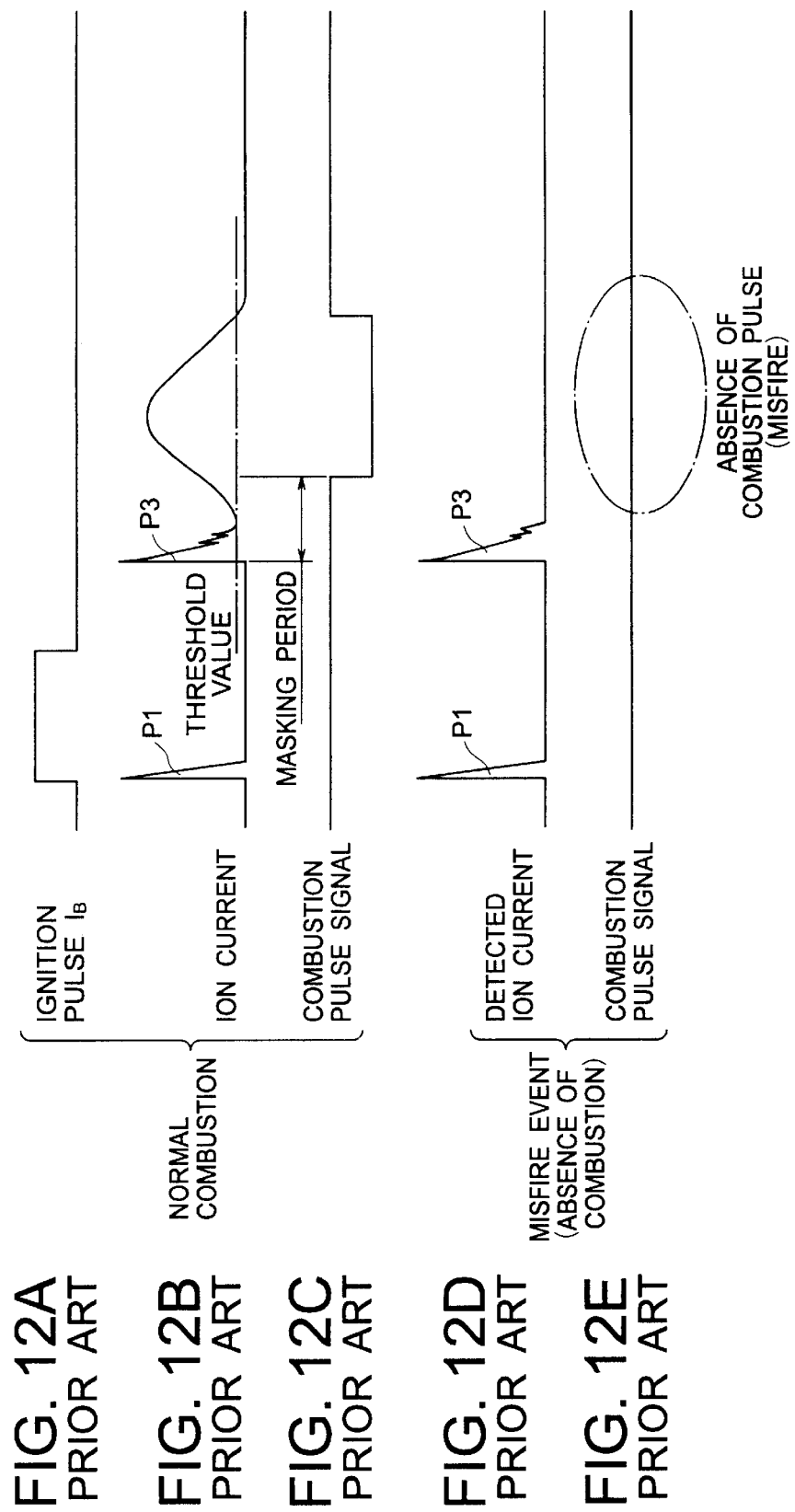

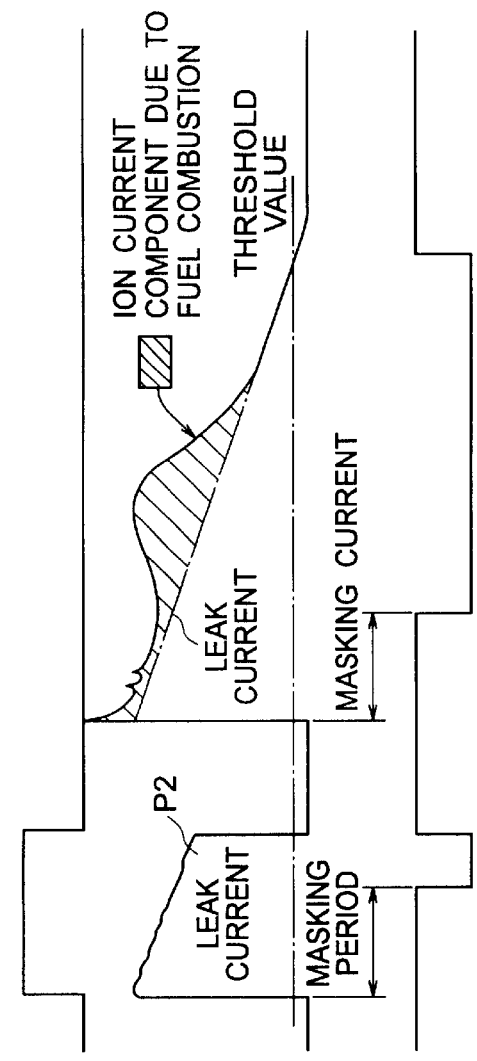

MISFIRE DETECTING APPARATUS FOR INTERNAL COMBUSTION ENGINE

BACKGROUND OF THE INVENTION

1. Field of the Invention

The present invention relates to a combustion/misfire detecting apparatus for an internal combustion engine for detecting combustion and misfire events taking place within a cylinder of the engine on the basis of an ion current making appearance upon combustion of an air/fuel mixture within the cylinder.

2. Description of Related Art

In general, it is known that ions are produced when the air/fuel mixture is burned within a cylinder of an internal combustion engine (hereinafter also referred to simply as the engine). Such ions can be detected in the form of an ion current by means of a probe which is disposed within the cylinder and to which a high voltage is applied as a bias voltage. Thus, by detecting presence or absence of the ion current, it is possible to detect occurrence of combustion or misfire event within all the engine cylinders discriminatively from one another.

For having better understanding of the concept underlying the present invention, background techniques thereof will first be reviewed in some detail. FIG. 11 is a block diagram showing a structure of a conventional misfire detecting apparatus for an internal combustion engine. In the figure, reference numeral 1 denotes an ignition circuit comprised of an ignition coil IG whose primary winding 11 has a high-voltage end applied with a voltage $V_B$ of positive or plus polarity while a low voltage end of the primary winding 11 is connected to a switching element 13 for turning on/off a primary current flowing through the primary winding 11. More specifically, the switching element is constituted by a power transistor having a collector electrode connected to the primary winding 11 as mentioned above and an emitter electrode connected to the ground potential. The base of the switching element 13 is connected to an input terminal of the ignition circuit 1 to which an ignition pulse signal $I_B$ issued by an electronic control unit or ECU (not shown) which is known per se is applied. On the other hand, the secondary winding 12 of the ignition coil IG has a high-voltage end connected to a spark plug 14 while the low-voltage end of the secondary winding 12 is connected to an ion current detecting unit 15 by a wiring conductor.

The ion current detecting unit 15 in turn is comprised of a bias circuit 16 for applying a vias voltage $V_B$ of plus polarity to the spark plug 14, a mask circuit 17 for cutting off or eliminating noises generated upon ignition and firing of the air/fuel mixture from the ion current as detected and a waveform shaper circuit 18 which is designed for shaping the ion current from which the noise component has been eliminated, to thereby output a combustion pulse signal. Incidentally, the noise generated upon firing of the air/fuel mixture as mentioned above will hereinafter be referred to as the ignition noise only for convenience of the description.

Next, description will be directed to the operation of the conventional misfire detecting apparatus. For making it possible to detect the ion current, the bias circuit 16 applies a high voltage of positive or plus polarity (also referred to as the bias voltage) to the spark plug 14 designed to serve also as an ion current detecting probe by making use of the secondary voltage of the ignition coil IG.

Upon application of an ignition pulse $I_B$ to the switching element 13, the primary current flowing through the primary winding 11 of the ignition coil IG is interrupted at a falling edge of the ignition pulse $I_B$, as a result of which a high voltage of negative or minus polarity is applied to the spark plug 14 connected electrically to the secondary winding 12 of the ignition coil IG, whereby a spark discharge is caused to occur between the electrodes of the spark plug 14. Thus, the air/fuel mixture is fired to undergo explosive combustion, which results in generation of ions within the engine cylinder due to the effect of the ionization.

In that case, the spark plug 14 will continue to remain in the state applied with the bias voltage of plus polarity from the bias circuit 16 which is charged with the secondary voltage of the ignition coil, even after extinction of the spark discharge. Consequently, the ions produced due to the ionization are caused to migrate under the action of the bias voltage. This migration of ions is detected as an ion current.

In this conjunction, it is however noted that before the ion current is detected, a steep pulse P1 makes appearance in response to rising of the ignition pulse $I_B$ and additionally a steep pulse P3 is produced before generation of the ion current at the time point when the air/fuel mixture is fired by the spark discharge occurring at the spark plug 14, as is illustrated in FIG. 12 at (a) and (b). These pulses P1 and P3 are detected as the ignition noises as well.

In general, the peak value of the ion current changes in dependence on the operation state of the engine. More specifically, there exists such a trend that the peak value of the ion current becomes smaller as the rotation number or speed (rpm) of the engine decreases while the former becomes larger as the latter increases. Usually, the peak value of the ion current lies within a range of several microamperes ($\mu A$) to several hundred microamperes. Under the circumstances, the threshold value used for detecting the ion current is set on the order of several microamperes with a view to detecting occurrence of the misfire event on the basis of the presence/absence of the ion current over the whole operation range of the engine.

However, when the threshold value is set on the order of several microamperes in practical applications as mentioned above, there may arise such unwanted situation that the ignition noises P1 and P3 produced upon rising of the ignition pulse $I_B$ as well as upon occurrence of the spark discharge at the spark plug 14 will be detected erroneously as the combustion pulse (i.e., the pulse indicating the combustion of the air/fuel mixture). For this reason, the steep noise pulses P1 and P3 each of a very short duration are eliminated by the mask circuit 17 so that only the ion current component is shaped into a pulse signal by the waveform shaper circuit 18 to be thereby outputted as the combustion pulse signal. Thus, so long as the combustion of the air/fuel mixture occurs normally, the combustion pulse signal indicative of the ion current can be outputted from the bias circuit 16 after lapse of the masking period from the start of the spark discharge, as can be seen in FIG. 12 at (c).

Referring to FIG. 12 at (d), there is illustrated a waveform of the ion current signal outputted upon occurrence of a misfire event. As can be seen from this figure, the noise pulse P1 generated upon rising of the ignition pulse as well as the noise pulse P3 generated upon occurrence of the spark discharge make appearance as the ignition noises. However, these ignition noise pulses P1 and P3 are eliminated by the mask circuit 17. Of course, no combustion pulse originating in the ion current is outputted from the waveform shaper circuit 18 either, because no combustion/explosion has taken place within the cylinder (i.e., because of occurrence of the misfire event), as is illustrated in FIG. 12 at (e).

So long as the normal combustion of the air/fuel mixture takes place, it is thus possible to make decision as to occurrence of the combustion/misfire events on the basis of presence/absence of the combustion pulse which can be derived by shaping the ion current with reference to a fixed threshold value. In this conjunction, it is however to be noted that soot may be deposited on the electrodes of the spark plug 14 as well as the inter-electrode gap thereof due to repetitive combustion of the air/fuel mixture although it depends on the operation state of the internal combustion engine. Such deposition of soot gives rise to a problem that a leak current takes place.

In more concrete, it is assumed, by way of example, that the bias voltage is 100 V and that the insulation resistance of the spark plug 14 deposited with soot is 5 MΩ. Then, the leak current of 20 μA can flow. More specifically, the leak current of 20 μA which attenuates monotonously with a predetermined time constant will flow into the ion current detecting unit 15, starting from the time point when the ignition pulse $I_B$ is applied, as can be seen in FIG. 13 at (a) and (b). Furthermore, in succession to the start of spark discharge at the spark plug 14, the leak current which decreases gradually and monotonously with the time constant CR determined by the high resistance presented by the soot deposition and the capacitance component C of the bias circuit makes appearance, wherein the ion current originating in the combustion of air/fuel mixture is superposed on the leak current, as is indicated by hatching in FIG. 13.

As can now be appreciated, when the leak current flows take place as mentioned above, then pulse shaping of the ion current inputted through the mask circuit 17 by the waveform shaper circuit 18 will incur a problem that the leak current of a predetermined pulse width produced upon application of the ignition pulse as well as the leak current making appearance upon spark discharge and decreasing monotonously and gradually with the time constant CR may undesirably be detected as the combustion pulses regardless of occurrence or non-occurrence of the misfire event. In other words, occurrence of the misfire event can not be detected with reasonable reliability when the leaks current happen.

SUMMARY OF THE INVENTION

In the light of the state of the art described above, it is an object of the present invention to provide a misfire detecting apparatus for an internal combustion engine which apparatus is capable of detecting only the ion current component originating in the fuel combustion regardless of occurrence of the leak currents so long as the combustion takes place normally, to thereby solve the problem mentioned above.

In view of the above and other objects which will become apparent as the description proceeds, there is provided according to an aspect of the present invention an misfire detecting apparatus for an internal combustion engine for detecting combustion of an air/fuel mixture and occurrence of misfire event within an engine cylinder of an internal combustion engine on the basis of an ion current which makes appearance upon combustion of the air/fuel mixture. The misfire detecting apparatus includes an ion current detecting means for detecting an ion current which depends on an amount of ions generated within the engine cylinder immediately after combustion of the air/fuel mixture within the engine cylinder, a leak current detecting means for detecting a leak current occurring between electrodes of a spark plug for firing the air/fuel mixture within the engine cylinder, a first waveform shaping means for shaping the ion current as detected into a pulse signal indicating combustion/misfire event by comparing with a first threshold value for deciding the ion current, the first threshold value being set on the basis of a level of the ion current upon rising thereof, the ion current being superposed on the leak current, and a means for outputting the pulse signal as a combustion pulse signal indicating combustion of the air/fuel mixture and occurrence of misfire event.

By virtue of the arrangement of the misfire detecting apparatus described above, the ion current superposed on the leak current can be shaped into a combustion pulse regardless of magnitude of the leak current, whereby the combustion pulse signal indicating occurrence of the fuel combustion within the relevant engine cylinder can be obtained with high reliability.

In a preferred mode for carrying out the invention, the misfire detecting apparatus for an internal combustion engine may further include a second waveform shaping means for shaping the ion current as detected into a pulse signal through comparison with a second fixed threshold value which is fixed at a value smaller than the first threshold value mentioned previously, and a selecting means for selectively outputting as the combustion pulse signal either a shaped pulse signal outputted from the first waveform shaping means upon detection of occurrence of the leak current or a shaped pulse signal outputted from the second waveform shaping means when no leak current is detected.

Owing to the misfire detecting apparatus described above, the combustion or misfire event can be detected with enhanced reliability notwithstanding of occurrence of the leak current, to an advantage.

In another preferred mode for carrying out the invention, the leak current detecting means may be so arranged as to compare a level of the ion current detected by the ion current detecting means during every combustion stroke of the internal combustion engine with a preset fixed threshold value for shaping the ion current into a pulse signal to thereby decide occurrence of the leak current when an integrated value of a predetermined current charged and discharged at high and low levels, respectively, of the pulse signal exceeds a predetermined value inclusive thereof.

Owing to the arrangement described above, the combustion and the misfire event can be detected with high reliability independently from operation state of the internal combustion engine, to another advantage.

In yet another preferred mode for carrying out the invention, the leak current detecting means may be so arranged as to decide occurrence of the leak current when a pulse width of a pulse signal derived by shaping the ion current signal detected by the ion current detecting means during an output period of an ignition pulse applied to the spark plug becomes greater a predetermined value inclusive thereof.

With the arrangement described above, the combustion and the misfire event can be detected at an earlier time point, to a further advantage.

In a further preferred mode for carrying out the invention, the leak current detecting means may be so arranged that upon power-on of the apparatus, the selecting means selects the pulse signal outputted from the first waveform shaping means, while in succeeding combustion strokes, occurrence of the leak current is detected in dependence on a pulse duration of the pulse signal outputted from the second waveform shaping means, to thereby allow the selecting means to change over the waveform shaping means.

With the above-mentioned arrangement, the combustion and the misfire event can be detected with high accuracy and reliability immediately after the start of the misfire detecting apparatus, to still another advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 12 is a timing chart for illustrating operation of a conventional misfire detecting apparatus for an internal combustion engine; and FIG. 13 is a timing chart for illustrating problems which the conventional misfire detecting apparatus suffers.

DESCRIPTION OF THE PREFERRED EMBODIMENTS

Figure 1:
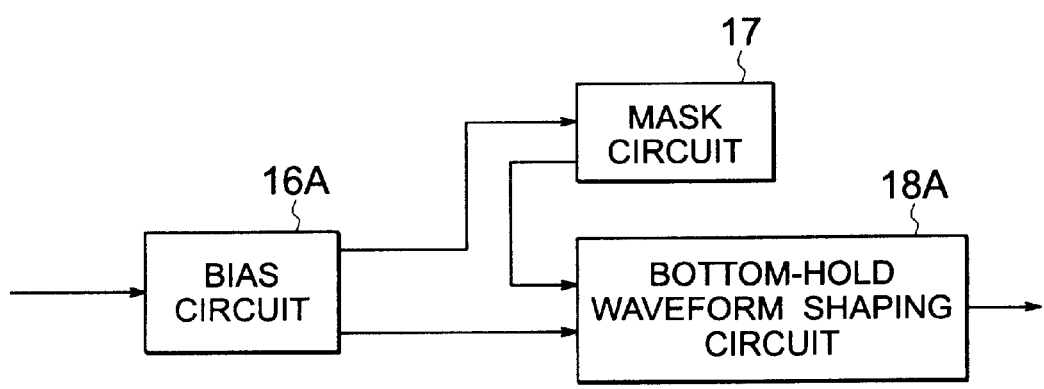
FIG. 1 is a block diagram showing schematically a general configuration of a misfire detecting apparatus for an internal combustion engine according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

FIG. 1 is a block diagram showing schematically and generally a structure of the misfire detecting apparatus for an internal combustion engine according to a first embodiment of the present invention. In the figure, reference character 16A denotes a bias circuit incorporated in the misfire detecting apparatus according to the instant embodiment of the invention. When a leak current is generated as described hereinbefore, the bias circuit 16A outputs an ion current signal superposed on a leak current which decreases gradually and monotonously. The output signal of the bias circuit 16A is supplied to a mask circuit 17 which is designed to perform the masking operation described hereinbefore and hold a bottom level of the ion current undergone the masking operation as a bottom-hold value, wherein a threshold value employed as the reference level for deciding occurrence of the ion current is set on the basis of the bottom-hold value mentioned above. Further, reference character 18A denotes a waveform shaper circuit which is designed to compare the level of the ion current derived after the masking operation and inputted from the bias circuit 16A with the threshold value which is set on the basis of the bottom-hold value as mentioned above, to thereby output the combustion pulse signal. Incidentally, the waveform shaper circuit will hereinafter be referred to as the bottom-hold waveform shaper circuit.

Next, description will be made of operation of the misfire detecting apparatus by reference to FIG. 2 together with FIG. 1.

Figure 2:
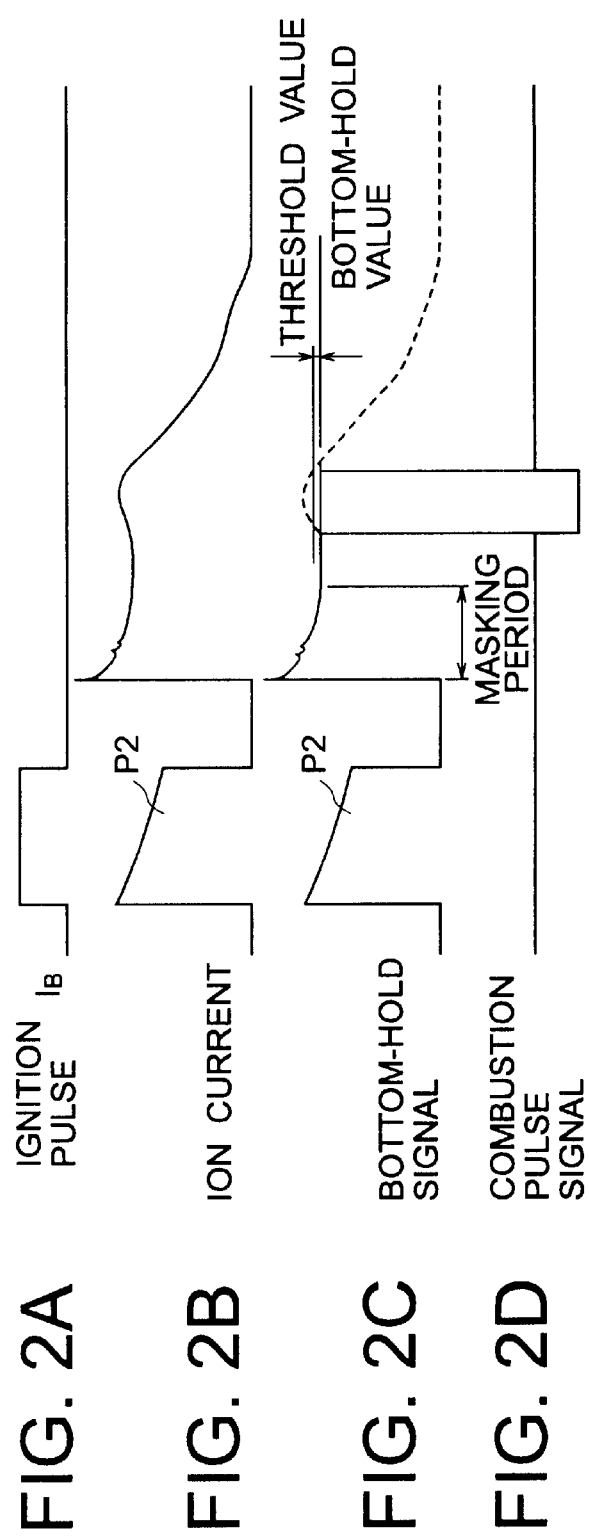
FIG. 2 is a timing chart for illustrating operation of the misfire detecting apparatus according to the first embodiment of the invention.

The ion current (see FIG. 2, (b)) outputted from the bias circuit 16A is inputted to the mask circuit 17 in which the pulse shaped with reference to the fixed threshold value mentioned above is cut for a predetermined time (i.e., for a masking period), as described hereinbefore. The bottom value of the ion current after lapse of the masking period is held as the bottom-hold value. Refer to FIG. 2 at (c). On the basis of this bottom-hold value, a threshold value which is referenced for making decision as to occurrence of the ion current is set (see FIG. 2, (c)).

On the other hand, when the ion current outputted from the bias circuit 16A is applied to the bottom-hold waveform shaper circuit 18A, the latter compares the ion current with the threshold value set on the basis of the bottom level of the ion current after the masking operation. At the time point when a level of the ion current exceeds the threshold value, the combustion pulse is outputted from the bottom-hold waveform shaper circuit 18A as the combustion pulse signal indicating occurrence of the ion current due to combination of the air/fuel mixture, as can be seen in FIG. 2, at (d).

Figure 11:
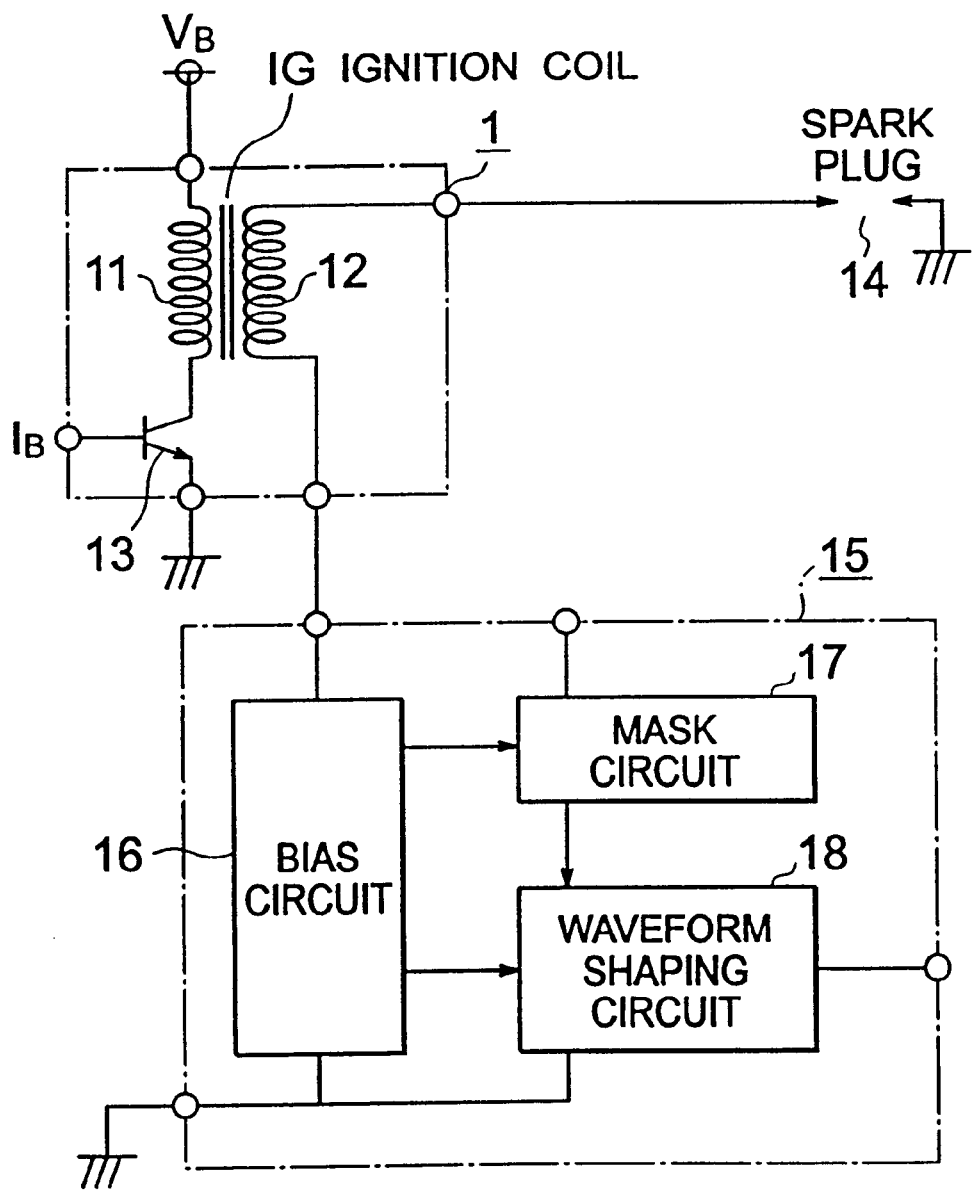
FIG. 11 is a block diagram showing schematically a structure of a conventional misfire detecting apparatus for an internal combustion engine.

It will now be understood that according to the teaching of the invention, the ion current superposed on the leak current can be shaped into a combustion pulse regardless of magnitude of the leak current, whereby the combustion pulse signal indicating occurrence of the fuel combustion within the relevant engine cylinder is outputted from the ion current detecting unit (15) shown in FIG. 11.

Embodiment 2

In the misfire detecting apparatus according to the first embodiment of the invention described above, detection of the ion current superposed on the leak current which decreases monotonously is realized by detecting the bottom value or level of the synthetic current waveform as a whole and by setting the threshold value for detecting the ion current indicative of combustion of the air/fuel mixture on the basis of the above-mentioned bottom value.

Figure 3:
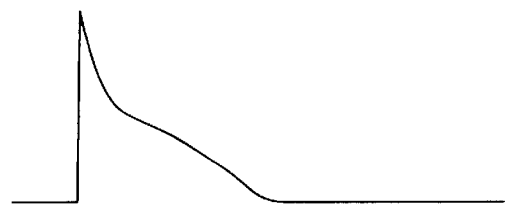
FIG. 3 is a signal waveform diagram for illustrating a waveform of the ion current which can be observed in a high-speed operation range of the engine where a leak current is difficult to occur.

It is however noted that the ion current waveform exhibiting no bottom level may make appearance in dependence on the engine operation states or conditions, as can be seen in FIG. 3. In general, such ion current waveform can be observed in a high-speed operation range of the engine in which the leak current is difficult to occur.

Accordingly, in the case mentioned above, it is preferred to detect at first occurrence or non-occurrence of the leak current, whereon the waveform shaping of the ion current is performed with reference to the threshold value which is based on the bottom-hold value, as described above in conjunction with the first embodiment, to thereby output as a combustion pulse signal when the leak current is detected. On the other hand, when no leak current is detected, waveform of the ion current is shaped with reference to a fixed threshold value or level which is smaller or lower than the threshold value set on the basis of the bottom-hold value, to thereby output the combustion pulse signal.

Figure 4:
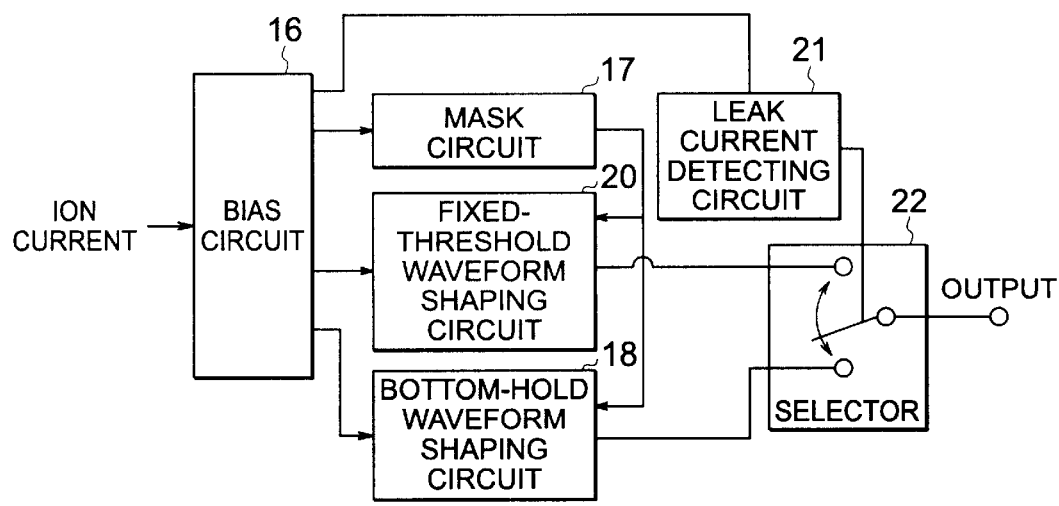
FIG. 4 is a block diagram showing generally a structure of a misfire detecting apparatus for an internal combustion engine according to a second embodiment of the present invention.

FIG. 4 is a block diagram showing generally a structure of a misfire detecting apparatus for an internal combustion engine according to a second embodiment of the present invention. In FIG. 4, components same as or equivalent to those described hereinbefore by reference to FIG. 1 are denoted by like reference characters, and repeated description thereof will be omitted. The misfire detecting apparatus shown in FIG. 4 further includes a leak current detecting circuit 21 for detecting the leak current, a fixed-threshold waveform shaper circuit 20 for shaping the ion current with reference to a fixed threshold value to thereby output the combination indicating pulse signal when no leak current is detected, and an output changeover circuit 22 for switching or changing over the outputs of the bottom-hold waveform shaper circuit 18 and the fixed-threshold waveform shaper circuit 20 from one to the other in dependence on the output of the leak current detecting circuit 21.

More specifically, the output changeover circuit 22 is so designed that when the leak current is detected by the leak current detecting circuit 21, the pulse signal derived from the ion current supplied from the bias circuit 16 by way of the mask circuit 17 by shaping the ion current with reference to the threshold value based on the bottom-hold value in the bottom-hold waveform shaper circuit 18 is outputted as the combustion pulse signal.

On the other hand, when no leak current is detected by the leak current detecting circuit 21, the ion current outputted from the bias circuit 16 by way of the mask circuit 17 is compared with the fixed threshold value by means of the fixed-threshold waveform shaper circuit 20 to be outputted as the shaped combustion pulse signal through the output changeover circuit 22.

Next, description will turn to operation of the misfire detecting apparatus for the internal combustion engine according to the instant embodiment of the invention. At first, upon reception of the ion current signal from the bias circuit 16, the leak current detecting circuit 21 makes decision as to which of the steep pulse P1 shown in FIG. 12 or the pulse P2 decreasing monotonously within the broad pulse width (long pulse duration) of the ignition pulse $I_B$ upon rising thereof, as illustrated in FIG. 13 has occurred.

When occurrence of the steep pulse P1 is detected, then decision is made that the leak current is absent, whereby the input to the output changeover circuit 22 is changed over to the output of the fixed-threshold waveform shaper circuit 20. On the other hand, when occurrence of the pulse P2 is detected, it is decided that the leak current is present, whereupon the output changeover circuit 22 is changed over so as to output the waveform-shaped ion current pulse generated by the bottom-hold waveform shaper circuit 18 as the combustion pulse signal.

Embodiment 3

In the misfire detecting apparatus according to the second embodiment of the invention, decision as to occurrence of the leak current is made by making decision which of the steep pulse P1 and the pulse P2 having a long duration is outputted from the bias circuit 16 upon rising of the ignition pulse $I_B$.

In the misfire detecting apparatus according to a third embodiment of the present invention, such arrangement is adopted that the level of the ion current outputted from the bias circuit 16 by way of the mask circuit 17 in every combustion stroke of the internal combustion engine is compared with a fixed threshold value such as mentioned above in conjunction with the second embodiment by the fixed-threshold waveform shaper circuit 20 to thereby shape the ion current into a pulse signal having high (H) and low (L) levels. The pulse signal is then applied to a leak current detecting circuit which includes an integrator constituted by a capacitor circuitry and a resistor circuitry, as is well known in the art. The capacitor circuitry of the integrator is charged and discharged with a predetermined current at high and low levels of the pulse signal outputted from the fixed-threshold waveform shaper circuit 20. When the output of the leak current detecting circuit exceeds a predetermined value, then occurrence of the leak current is determined.

Figure 5:
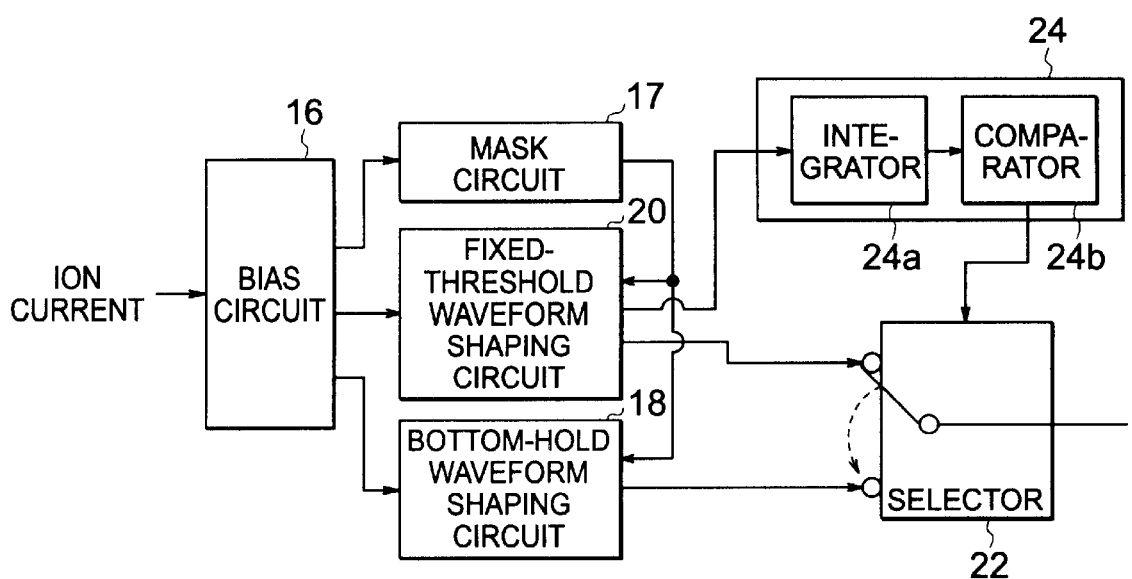
FIG. 5 is a block diagram showing generally a structure of a misfire detecting apparatus for an internal combustion engine according to a third embodiment of the present invention.

FIG. 5 is a block diagram showing generally a structure of a misfire detecting apparatus for an internal combustion engine according to the third embodiment of the present invention. In the figure, components same as or equivalent to those described hereinbefore by reference to FIG. 3 are denoted by like reference characters, and repeated description thereof is omitted. In FIG. 5, reference numeral 24 denotes the leak current detecting circuit which is comprised of an integrator 24a and a comparator 24b. The integrator 24a may be constituted by a capacitor circuitry and a resistor circuitry, as is well known in the art, although illustration thereof is omitted. The capacitor circuitry constituting a part of the integrator 24a is charged and discharged with a predetermined current at every high and low levels of the pulse signal (output of the fixed-threshold waveform shaper circuit 20) which results from the waveform shaping of the ion current signal with the fixed threshold value after the masking period upon every detection of the ion current. On the other hand, the comparator 24b compares the integrated value signal outputted from the integrator 24a (signal indicative of the potential level of the capacitor circuitry of the integrator 24a) with a predetermined value, to thereby decide occurrence of the leak current when the integrated value reaches or exceeds the predetermined value.

Figure 6:
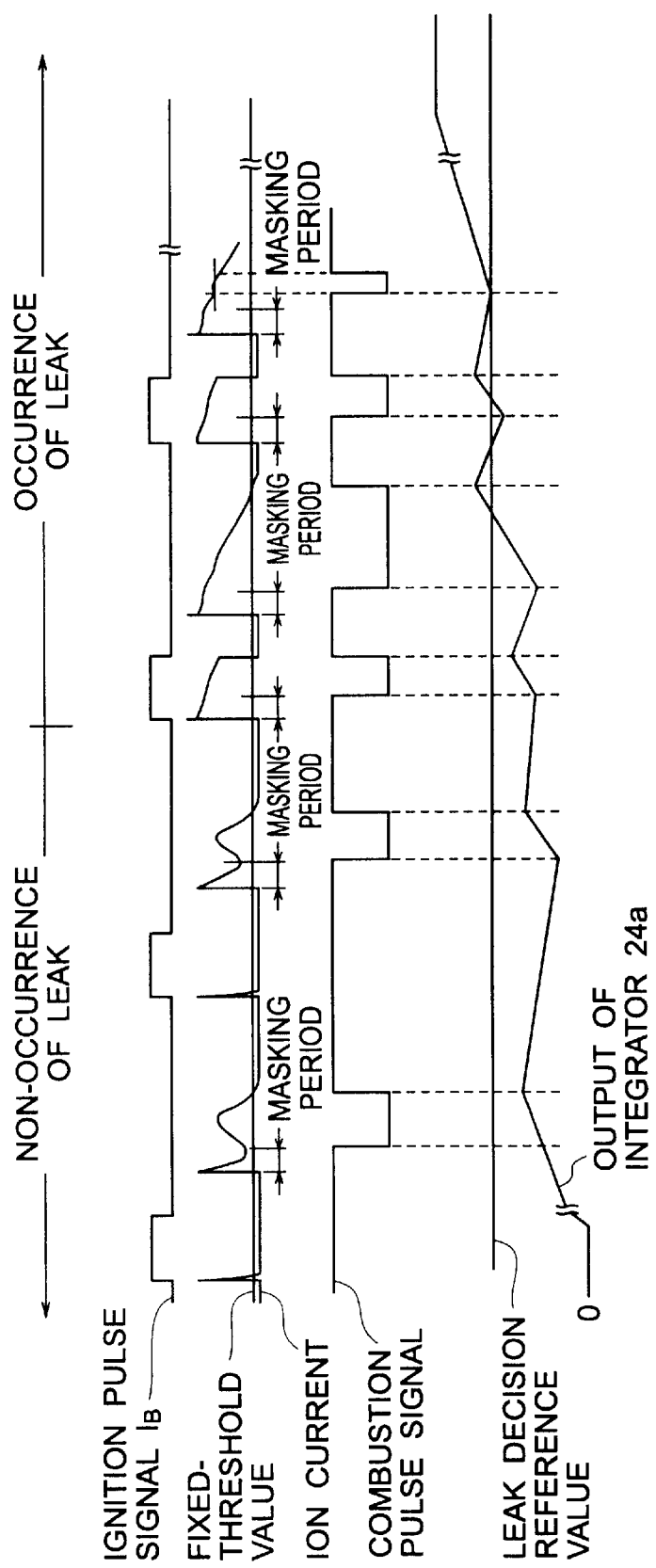
FIG. 6 is a timing chart for illustrating operation of the misfire detecting apparatus according to the third embodiment of the invention.

Operation of the misfire detecting apparatus according to the instant embodiment will be described in more detail by referring to a timing chart shown in FIG. 6 in combination with FIG. 5. In the leak current detecting circuit 24, the capacitor circuitry (not shown) constituting a part of the integrator 24a is charged and discharged with a predetermined current at high and low levels, respectively, of the pulse signal derived by shaping the ion current signal with the fixed threshold value after lapse of the masking period upon every application of the ignition pulse $I_B$.

In this conjunction, it is to be noted that when no leak current makes appearance, the ion current is composed of the current component which is intrinsically ascribable to the combustion of the air/fuel mixture. Accordingly, the pulse shaping of the ion current will result in the pulse signal containing pulses each of a relatively short duration (i.e., narrow pulse width). On the other hand, when the leak current takes place with the ion current being superposed thereon, the time taken for the leak current decreases below the fixed threshold value can be determined by the time constant CR, wherein R represents a resistance value of the inter-electrode gap or current path of the spark plug 14 while C represents a capacitance component of the bias circuit 16. Consequently, waveform shaping of the ion current into the pulse signal with reference to the fixed threshold value will result in the pulse signal whose pulse duration is long (i.e., pulse width is broad).

On the basis of the ion current signal generated upon every combustion stroke (output of the fixed-threshold waveform shaper circuit 20), the predetermined current mentioned previously is integrated by the integrator 24*a* in the manner described previously, whereon the integrated value outputted from the integrator 24*a* is compared with the leak-current decision reference value by means of the comparator 24*b*. In that case, when the integrated value exceeds the leak-current decision reference value, a signal indicating occurrence of the leak current is outputted to the output changeover circuit 22 from the leak current detecting circuit 24. In response to this signal, the output changeover circuit 22 is set to the position at which the pulse signal derived by shaping the waveform of the ion current with the bottom-hold waveform shaper circuit 18 is outputted. To say in another way, the output of the bottom-hold waveform shaper circuit 18 is generated as the output signal of the ion current detecting unit (15).

In this way, occurrence of the leak current can be detected essentially without fail in a facilitated manner independent of the rotation speed (rpm) of the internal combustion engine. Of course, the combustion indicating signal can be outputted regardless of occurrence or non-occurrence of the leak current, needless to say.

Embodiment 4

In the misfire detecting apparatus according to the third embodiment of the invention described above, decision as to occurrence of the leak current is realized by integrating the predetermined current at high and low levels of the combustion pulse signal. A fourth embodiment of the invention is directed to the misfire detecting apparatus which is so designed as to decide occurrence or non-occurrence of the leak current during every output period of the ignition pulse $I_B$ with a view to determining the occurrence of the leak current at an earlier time point.

Figure 8:
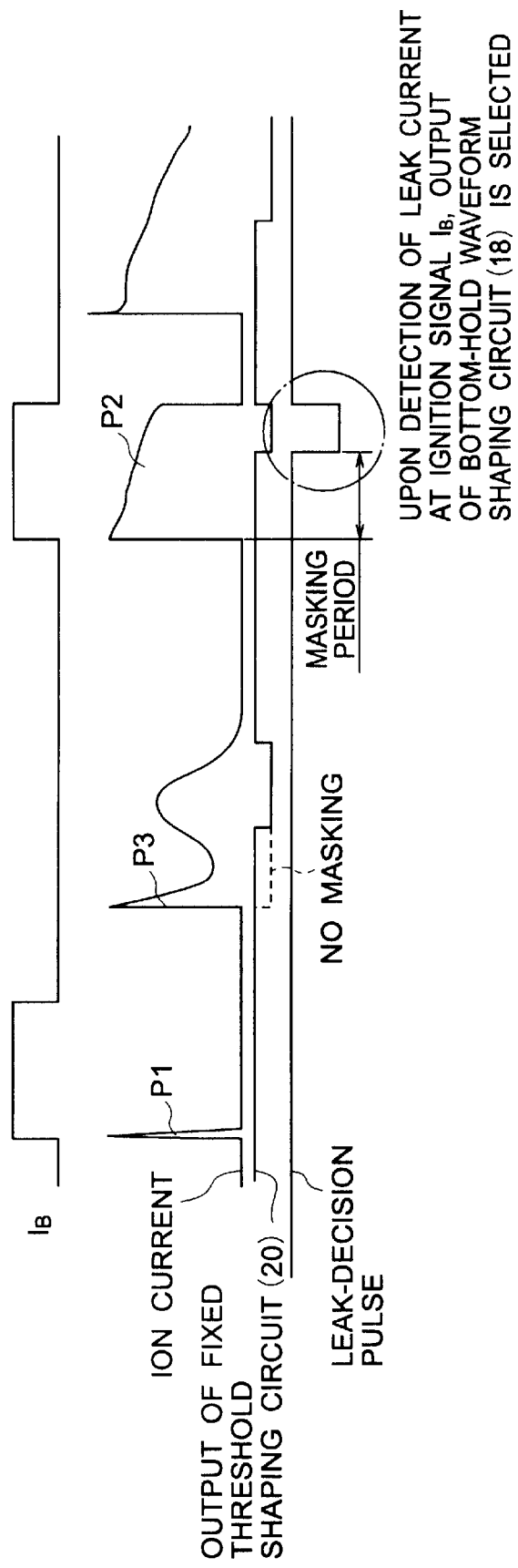
FIG. 8 is a timing chart for illustrating operation of the misfire detecting apparatus according to the fourth embodiment of the invention.

Referring to FIG. 8, when the leak current occurs during the output period of the ignition pulse $I_B$, the ion current is shaped into the pulse signal by the fixed-threshold waveform shaper circuit 20 after having undergone the masking operation of the mask circuit 17, whereby a leak current decision pulse of level "L" is outputted from the fixed-threshold waveform shaper circuit 20.

Figure 7:
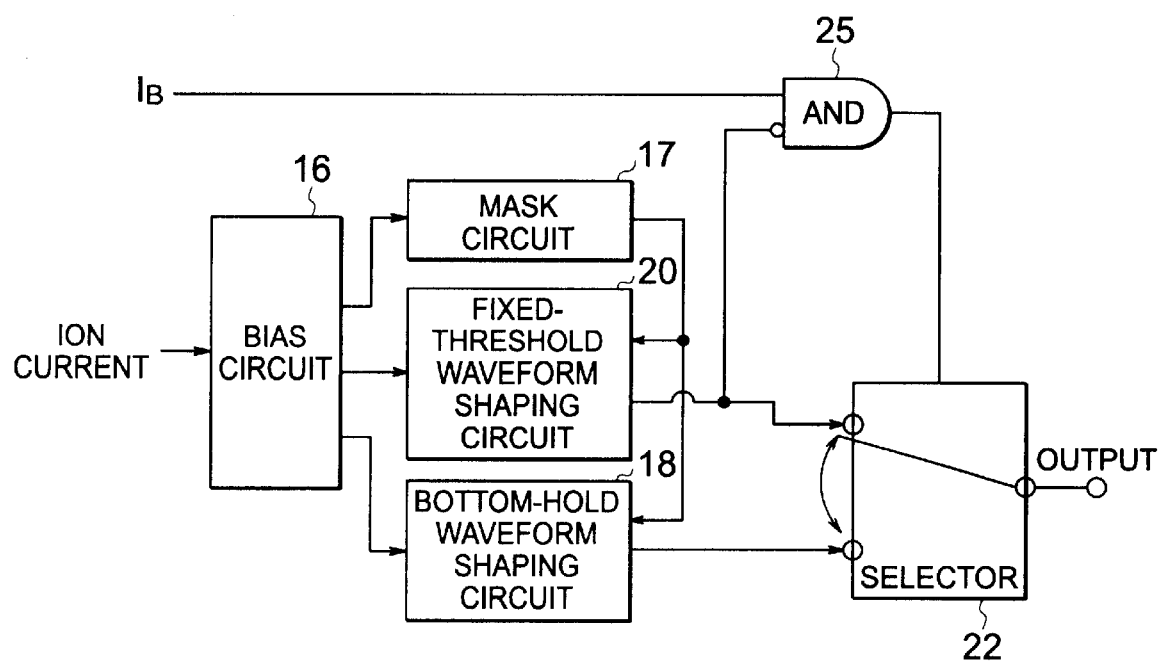
FIG. 7 is a block diagram showing generally a structure of a misfire detecting apparatus for an internal combustion engine according to a fourth embodiment of the present invention.

Operation of the misfire detecting apparatus according to the instant embodiment of the invention will be made in detail by referring to FIGS. 7 and 8, in which FIG. 7 is a block diagram showing a structure of the leak current decision circuit according to the fourth embodiment of the invention. As can be seen in FIG. 7, there is provided a logical AND circuit 25 for logically ANDing the output of the fixed-threshold waveform shaper circuit 20 and the ignition pulse $I_B$. When the signal of level "L" is inputted to the AND circuit 25 from the fixed-threshold waveform shaper circuit 20 during the period in which the ignition pulse $I_B$ of level "H" is being inputted, a leak-current decision pulse of level "H" indicating occurrence of the leak current is outputted from the AND circuit 25 to be inputted to the output changeover circuit 22 as the output changeover control signal. In response to this signal, the output changeover circuit 22 changes over the output of the ion current detecting unit (15) to the bottom-hold waveform shaper circuit 18 from that of the fixed-threshold waveform shaper circuit 20.

In more detail, in the misfire detecting apparatus according to the instant embodiment of the invention, the ion current signal is ordinarily inputted to the fixed-threshold waveform shaper circuit 20 from the bias circuit 16 by way of the mask circuit 17 during the duration of the ignition pulse $I_B$. At first, the noise pulse P1 makes appearance in the ion current upon rising of the ignition pulse $I_B$. The duration of this noise pulse P1 is shorter than the masking period. Consequently, the first noise pulse P1 disappears after lapse of the masking period, as a result of which the output of the fixed-threshold waveform shaper circuit 20 is maintained at level "H". Thus, the output of the AND circuit 25 assumes the level "L". In that case, the output of the fixed-threshold waveform shaper circuit 20 is selected as the output signal of the ion current detecting unit (15) by the output changeover circuit 22.

It is now assumed that a leak current occurs at the spark plug 14 in the succeeding combustion stroke. In that case, the ignition noise P2 which decreases monotonously within the pulse width of the ignition pulse $I_B$ makes appearance during the duration or period of the ignition pulse $I_B$.

The ignition noise P2 is inputted to the fixed-threshold waveform shaper circuit 20 from the bias circuit 16 by way of the mask circuit 17 after the lapse of the masking period, as a result of which the combustion indicating pulse of level "L" is inputted to the AND circuit 25 from the fixed-threshold waveform shaper circuit 20 because the voltage level of the ignition noise P2 is higher than the fixed threshold value.

The AND circuit 25 then outputs the signal of level "H" to the output changeover circuit 22 as the output changeover control signal. In response, the output changeover circuit 22 changes over the input thereof to the output of the bottom-hold waveform shaper circuit 18 from that of the fixed-threshold waveform shaper circuit 20. Consequently, the shaped combustion pulse signal generated through comparison of the threshold value which is based on the bottom-hold value with the ion current component superposed on the leak current is selected as the output of the ion current detecting unit (15).

Embodiment 5

The misfire detecting apparatus according to the fourth embodiment of the invention is so arranged that when occurrence of the leak current is decided during the duration or period of the ignition pulse $I_B$ after lapse of the masking period, the output of the bottom-hold waveform shaper circuit 18 is selected to thereby output the combustion pulse signal indicative of only the ion current component superposed on the leak current.

According to the invention incarnated in a fifth embodiment thereof, the misfire detecting apparatus for the internal combustion engine is so arranged as to be capable of detecting combustion or misfire event by deciding presence/absence of the ion current component superposed on the leak current even when the leak current occurs immediately after the start of operation of the apparatus.

Figure 9:
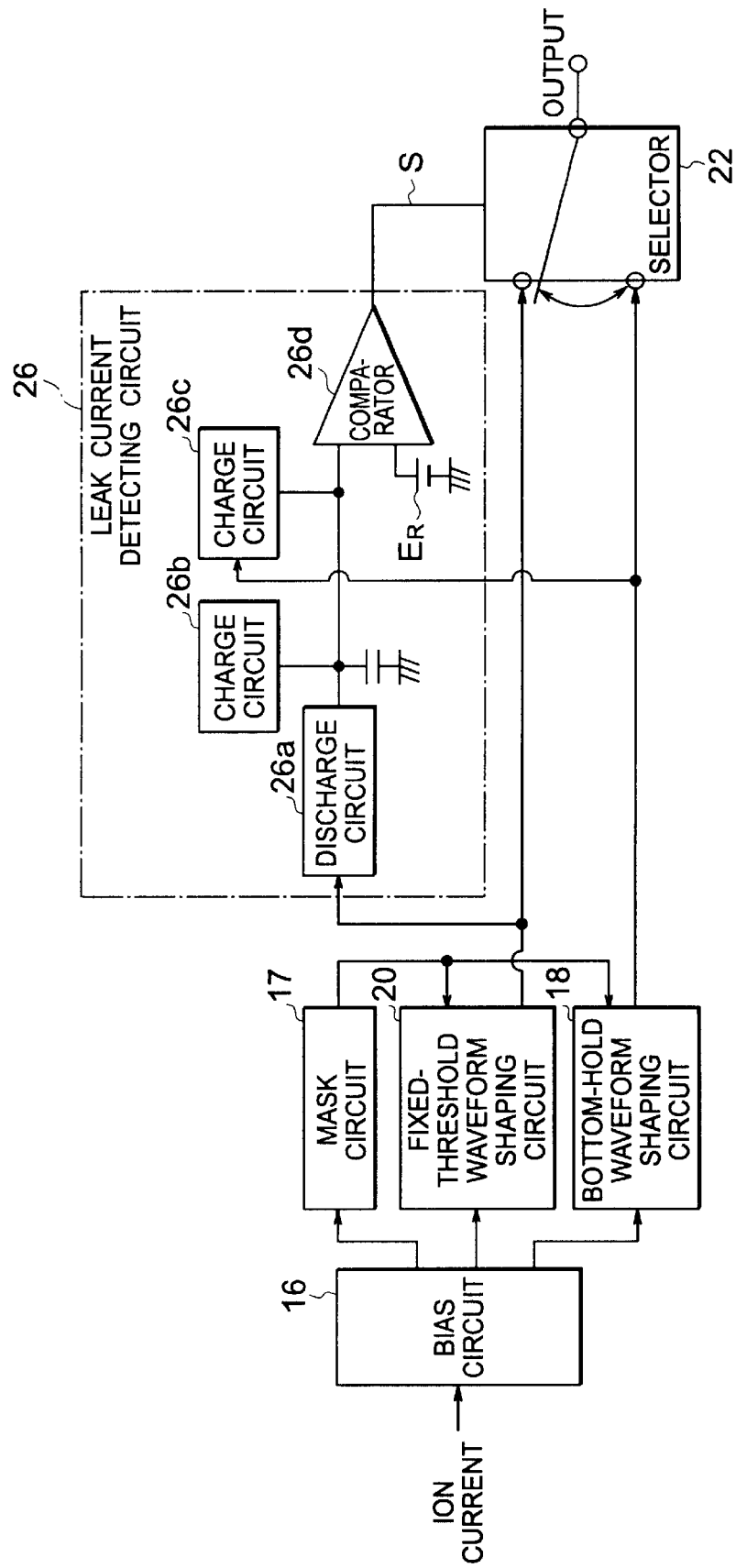
FIG. 9 is a block diagram showing generally a structure of a misfire detecting apparatus for an internal combustion engine according to a fifth embodiment of the present invention.
Figure 10:
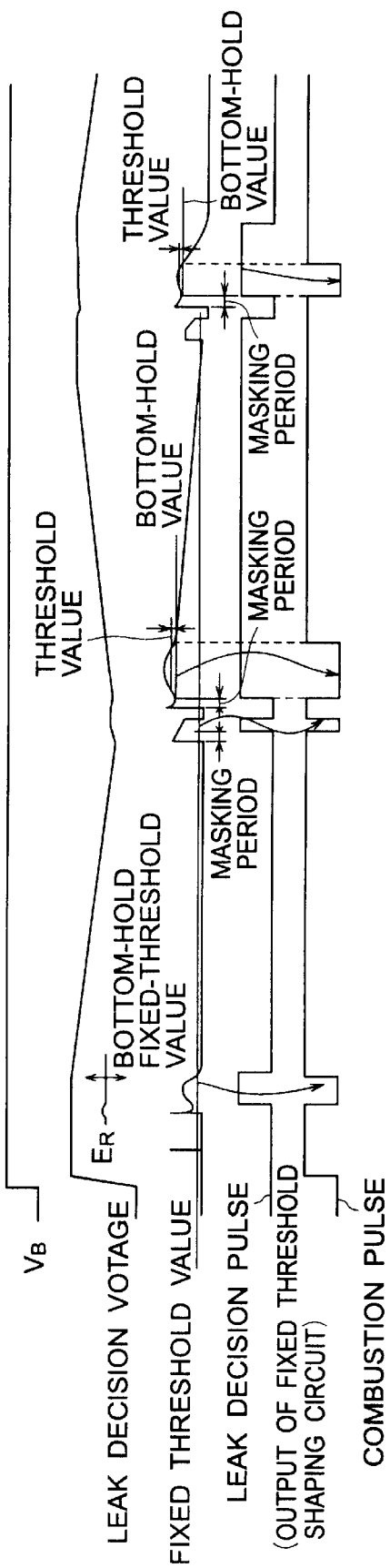
FIG. 10 is a timing chart for illustrating operation of the misfire detecting apparatus according to the fifth embodiment of the invention.

FIG. 9 is a block diagram showing generally a structure of a misfire detecting apparatus for an internal combustion engine according to the fifth embodiment of the present invention, and FIG. 10 is a timing chart for illustrating operation of the misfire detecting apparatus shown in FIG. 9. In FIG. 9, components same as or equivalent to those described hereinbefore by reference to FIG. 7 are denoted by like reference characters, and repeated description thereof is omitted. In FIG. 9, reference numeral 26 denotes a leak current detecting circuit implemented according to the teaching of the invention. The leak current detecting circuit 26 is comprised of a decision-destined voltage charging circuit 26c for charging a voltage used for making decision as to occurrence of the leak current simultaneously with power-on of the apparatus, a comparator 26d for comparing the leak current decision voltage charged in the decision-destined voltage charging circuit 26c with a reference voltage $E_R$ to thereby output a changeover signal S for making the output changeover circuit 22 to change over the input thereof to the output of the bottom-hold waveform shaper circuit 18 or that of the fixed-threshold waveform shaper circuit 20 in dependence on whether or not the leak current decision voltage exceeds the reference voltage $E_R$, and a combination of a charging circuit 26b and a discharging circuit 26a for charging the leak current decision voltage when the leak current decision signal outputted from the fixed-threshold waveform shaper circuit 20 is at level "H" in dependence on the pulse duration while discharging the leak current decision voltage when the leak current decision signal is at level "L" in dependence on the pulse duration.

Operation of the misfire detecting apparatus according to the fifth embodiment of the invention will be described. Upon power-on of the apparatus, the leak current decision voltage is charged in the decision-destined voltage charging circuit 26c up to a level equal to or higher than that of the reference voltage $E_R$. As a result of this, the comparator 26d outputs a high (H)-level signal, whereby the output changeover circuit 22 is charged over to be connected to the output terminal of the bottom-hold waveform shaper circuit 18. In this way, the combustion pulse signal derived by shaping only the ion current component superposed on the leak current with the bottom-hold value mentioned hereinbefore can be outputted even when the leak current occurs immediately after the power-on of the apparatus.

In this conjuncture, it should however be noted that the ion current is inputted to the fixed-threshold waveform shaper circuit from the bias circuit 16 by way of the mask circuit 17 every time the ignition pulse $I_B$ is outputted, whereby the individual ion currents undergo waveform shaping through comparison with the fixed threshold value, whereby the leak current decision pulse of level "H" or level "L" is outputted. When the leak current decision pulse is at level "L", the leak current decision voltage charged in the decision-destined voltage charging circuit 26c is discharged to a level determined by the pulse width by means of the discharging circuit 26a. On the other hand, when the leak current decision pulse is at level "H", the leak current decision voltage is charged in the decision-destined voltage charging circuit 26c to a level determined by the pulse width by means of the charging circuit 26b.

The leak current decision voltage discharged or charged in the manner described above is compared with the reference voltage $E_R$ by the comparator 26d. When the leak current decision voltage is at a level lower than the reference voltage $E_R$, the output of the ion current detecting unit (15) is changed over to that of the fixed-threshold waveform shaper circuit 20 by the output changeover circuit 22 in response to the output of the comparator 26d. As a result of this, the combustion pulse derived by shaping the ion current when no leak current makes appearance can be outputted. On the other hand, when the leak current decision voltage is at a level higher than the reference voltage $E_R$, the output of the ion current detecting unit (15) is changed over to that of the bottom-hold waveform shaper circuit 18 by means of the output changeover circuit 22 in response to the output of the comparator 26d. As a result of this, the combustion pulse derived by shaping only the ion current component superposed on the leak current can be outputted.

Many modifications and variations of the present invention are possible in the light of the above techniques. It is therefore to be understood that within the scope of the appended claims, the invention may be practiced otherwise than as specifically described.

What is claimed is:

1. A misfire detecting apparatus for an internal combustion engine for detecting combustion of an air/fuel mixture or occurrence of misfire event within an engine cylinder of an internal combustion engine on the basis of an ion current which makes appearance upon combustion of the air/fuel mixture, comprising:

ion current detecting means for detecting an ion current which depends on an amount of ions generated within said engine cylinder immediately after combustion of the air/fuel mixture within said engine cylinder;

first waveform shaping means for shaping the ion current as detected into a pulse signal indicating combustion/misfire event by comparing with a first threshold value for deciding occurrence of the ion current, said first threshold value being set on the basis of a bottom-hold value of said ion current; and means for outputting said pulse signal as a combustion pulse signal indicating either combustion of the air/fuel mixture or occurrence of misfire event.

2. A misfire detecting apparatus for an internal combustion engine for detecting combustion of an air/fuel mixture or occurrence of misfire event within an engine cylinder of an internal combustion engine on the basis of an ion current which makes appearance upon combustion of the air/fuel mixture, comprising:

ion current detecting means for detecting an ion current which depends on an amount of ions generated within said engine cylinder immediately after combustion of the air/fuel mixture within said engine cylinder;

first waveform shaping means for shaping the ion current as detected into a pulse signal indicating combustion/misfire event by comparing with a first threshold value for deciding occurrence of the ion current, said first threshold value being set on the basis of a bottom-hold value of said ion current;

means for outputting said pulse signal as a combustion pulse signal indicating either combustion of the air/fuel mixture or occurrence of misfire event;

second waveform shaping means for shaping the ion current as detected into a pulse signal through comparison with a second fixed threshold value which is fixed at a value smaller than said first threshold value;

leak current detecting means for detecting a leak current occurring between electrodes of a spark plug for firing the air/fuel mixture within said engine cylinder; and selecting means for selectively outputting as said combustion pulse signal either a shaped pulse signal outputted from said first waveform shaping means upon detection of occurrence of said leak current or a shaped pulse signal outputted from said second waveform shaping means when no leak current is detected.

3. A misfire detecting apparatus for an internal combustion engine according to claim 2, wherein said leak current detecting means is so arranged as to compare a level of the ion current detected by said ion current detecting means during every combustion stroke of said internal combustion engine with a preset fixed threshold value for shaping said ion current into a pulse signal to thereby decide occurrence of the leak current when an integrated value of a predetermined current charged and discharged at high and low levels, respectively, of said pulse signal exceeds a predetermined value inclusive thereof.

4. A misfire detecting apparatus for an internal combustion engine according to claim 2, wherein said leak current detecting means is so arranged as to decide occurrence of the leak current when a pulse width of a pulse signal derived by shaping the ion current signal detected by the ion current detecting means during an output period of an ignition pulse applied to said spark plug becomes greater than a predetermined value inclusive thereof.

5. A misfire detecting apparatus for an internal combustion engine according to claim 2, wherein said leak current detecting means is so arranged that upon power-on of said apparatus, said selecting means selects the pulse signal outputted from said first waveform shaping means, while in succeeding combustion strokes, occurrence of the leak current is detected in dependence on a pulse duration of the pulse signal outputted from said second waveform shaping means, to thereby allow said selecting means to change over between said first and second waveform shaping means.

\* \* \* \* \*